(12) United States Patent
Tuma et al.

(10) Patent No.: US 6,173,385 B1
(45) Date of Patent: Jan. 9, 2001

(54) ADDRESS GENERATOR FOR SOLID STATE DISK DRIVE

(75) Inventors: George B. Tuma, Scotts Valley, CA (US); Wade B. Tuma, Reno, NV (US)

(73) Assignee: Disk Emulation Systems, Inc., Santa Clara, CA (US)

( * ) Notice: Under 35 U.S.C. 154(b), the term of this patent shall be extended for 0 days.

(21) Appl. No.: 08/155,332

(22) Filed: Nov. 19, 1993

(51) Int. Cl.[7] .................................................. G06F 12/10
(52) U.S. Cl. .................. 711/219; 711/200; 711/201; 711/202; 711/203; 711/212; 711/213; 711/214; 711/215; 711/216; 711/217; 711/218; 711/220
(58) Field of Search .................... 395/406, 500; 365/189.02; 711/200–203, 212–220

(56) References Cited

U.S. PATENT DOCUMENTS

| | | | |
|---|---|---|---|
| 5,070,474 | 12/1991 | Tuma et al. ........................ | 395/500 |
| 5,088,031 | * 2/1992 | Takasaki et al. .................. | 395/400 |
| 5,179,662 | 1/1993 | Corrigan et al. ................. | 395/250 |
| 5,218,691 | 6/1993 | Tuma et al. ........................ | 395/500 |
| 5,343,426 | * 8/1994 | Cassidy et al. .................. | 395/425 |

* cited by examiner

*Primary Examiner*—Do Hyun Yoo
*Assistant Examiner*—Than Nguyen
(74) *Attorney, Agent, or Firm*—Skjerven Morrill MacPherson LLP; Norman R. Klivans

(57) ABSTRACT

An address generator for a solid state disk drive device includes a hardware multiplier logic circuit dedicated to computation of the address by multiplying a lock size by a logical block number, to obtain the start address for a memory array read or write operation. The dedicated multiplier circuit advantageously provides very quick computation of these relatively large numbers, which typically involves a 32 bit by 16 bit multiplication. The multiplier includes a shift register initially holding the logical block number which is shifted a particular number of times, the number of shift pulses representing a value of the block length. The output of the shift register is the desired address.

1 Claim, 15 Drawing Sheets

Microfiche Appendix Included
(1 Microfiche, 35 Pages)

READ EXTEND Command Descriptor Block

| Byte | Bit | | | | | | | |
|---|---|---|---|---|---|---|---|---|
| | 07 | 06 | 05 | 04 | 03 | 02 | 01 | 00 |
| 00 | 0 | 0 | 1 | 0 | 1 | 0 | 0 | 0 |
| 01 | Logical Unit Number | | | Reserved | | | | RelAdr |
| 02 | Logical Block Address (MSB) | | | | | | | |
| 03 | Logical Block Address | | | | | | | |
| 04 | Logical Block Address | | | | | | | |
| 05 | Logical Block Address (LSB) | | | | | | | |
| 06 | Reserved | | | | | | | |
| 07 | Transfer Length (MSB) | | | | | | | |
| 08 | Transfer Length (LSB) | | | | | | | |
| 09 | Vendor Unique | | Reserved | | | | Flag | Link |

FIG. 2

ADDRESS GENERATOR FOR SOLID STATE DISK DRIVE

MICROFICHE APPENDIX

This disclosure includes a microfiche appendix having 1 fiche and a total of 35 frames.

1. Field of the Invention

This invention relates to address generators and more specifically to an address generator for a "solid state disk" which is a random access memory device which appears to a host computer system to be a disk drive.

2. Description of the Prior Art

The well known SCSI interface is ideal for high performance solid state disks. Unlike ESDI or SMD interfaces, the SCSI interface presents the peripheral with the number of the desired logical block to be accessed. Solid State Disks (SSDs), based on contiguous random access (semiconductor) memory chips, can access the proper information based on the specified logical block. An example of an SSD (which however is not block-length oriented) is disclosed in U.S. Pat. No. 5,070,474.

Referring to the system diagram in FIG. 1, the SCSI host computer 10 presents the SSD 12 with a command to read or write along with the desired logical block and the number of blocks to be written or read on SCSI bus 14. The SSD controller 16 must interpret this command received from SCSI interface 18 and set the DRAM memory array 22 (DRAM chips) to the appropriate starting address via address generator 26. This is analogous to the seek time in a rotating (physical) disk drive. The controller 16 then reads or writes the proper number of blocks to the memory array 22 on address bus 24. (Block-length oriented SSDs are known in the art.) Address generator 26 operates in response to signal AGEN from controller 16.

SSD 12 also conventionally includes DMA (direct memory address) controller 30 and error correction circuitry 32 connected by various busses as shown. Also included is a backup interface 34 and backup physical disk 38.

A difficulty arises due to the variable length of the logical blocks. Consider a typical host computer system 10 based on a logical block length of 512 bytes per block. Block zero begins at an address of zero, block one begins 512 bytes later, block two at 1024 bytes and so on. Should a second system be based upon a block size of 256 bytes per block these addresses would change. In this case block zero would still begin at byte zero, but block one would occur at byte 256, block two at byte 512 and so on.

The method for locating the desired starting address is:

Starting Address=Desired Logical Block×Logical Block Length

While the method is simple, the magnitude of the variables causes difficulty. The SCSI read/write extended commands specify the desired logical block as a 32 bit variable. The logical block length is as large as 16 bits in a typical computer system. Normally this multiplication is performed in software in a microprocessor or microcontroller 16 using multiply functions or various shifting techniques. Such operations on variables of this magnitude can require many machine cycles on small (reasonably priced) microcontrollers. This results in long seek times which are undesirable in a solid state disk. Microcontrollers allowing 32 bit operations are expensive, difficult to embed and otherwise unnecessary for a typical SCSI peripheral.

SUMMARY OF THE INVENTION

The present invention in one embodiment includes a dedicated logic circuit for determining the desired starting address of an SSD operation (read or write). The circuit is a multiplier circuit which, as data block numbers are received by the multiplier, multiplies the data block number by a block size value to quickly generate the address. The block size value is (in one embodiment) programmed once, at power up of the SSD, with the appropriate value for the desired block size. (Alternatively the block size value is dynamically alterable after power up). The access time is in the submicrosecond range for any typical block size.

In a typical SCSI application where a physical (not solid state) disk drive is used, the speed limit of the system is fairly low due to the relatively slow access time of a physical disk drive. The same is true for the relatively slow access time for tape drives and other types of rotating magnetic memory. Thus in these cases, there is no need for a higher speed address generator than that provided in the prior art software address generation calculation, and so use of a dedicated multiplier logic circuit in a physical disk drive address generator would not appear generally to be useful.

BRIEF DESCRIPTION OF THE DRAWINGS

FIG. 2 is a typical computer peripheral interface bus command packet.

DETAILED DESCRIPTION OF THE INVENTION

A SCSI peripheral is a block oriented device. Read or write operations specify a starting logical block, and the number of blocks to be written or read. The logical block size is selected by the host computer using a mode select command. The SCSI peripheral stores the logical block size in a non-volatile location. This logical block size remains valid until a subsequent mode select command modifies the block size again.

During the initial power up phase, a SCSI SSD retrieves the appropriate size value for logical blocks. The correct logical block size multiplication factor is then programmed into the address generation circuit in accordance with the invention.

Normal operation begins when the host computer system issues a read or write command to the SSD. The SCSI interface logic receives the command and checks the validity of the command packet. An example of a SCSI valid command packet is shown in FIG. 2. Bytes 02 to 05 specify the logical block at which the read operation is to begin. When the command has been determined valid, the SCSI interface logic 18 signals the microprocessor 16 in the SSD that a valid command packet is present in the buffer of the SCSI interface logic 18.

The microprocessor 16 then reads the command packet from the SCSI interface 18 buffer. If the command is determined to require reading or writing data, then the microprocessor 16 transfers the starting logical block information directly to the address generation circuit 26.

Figure 3:
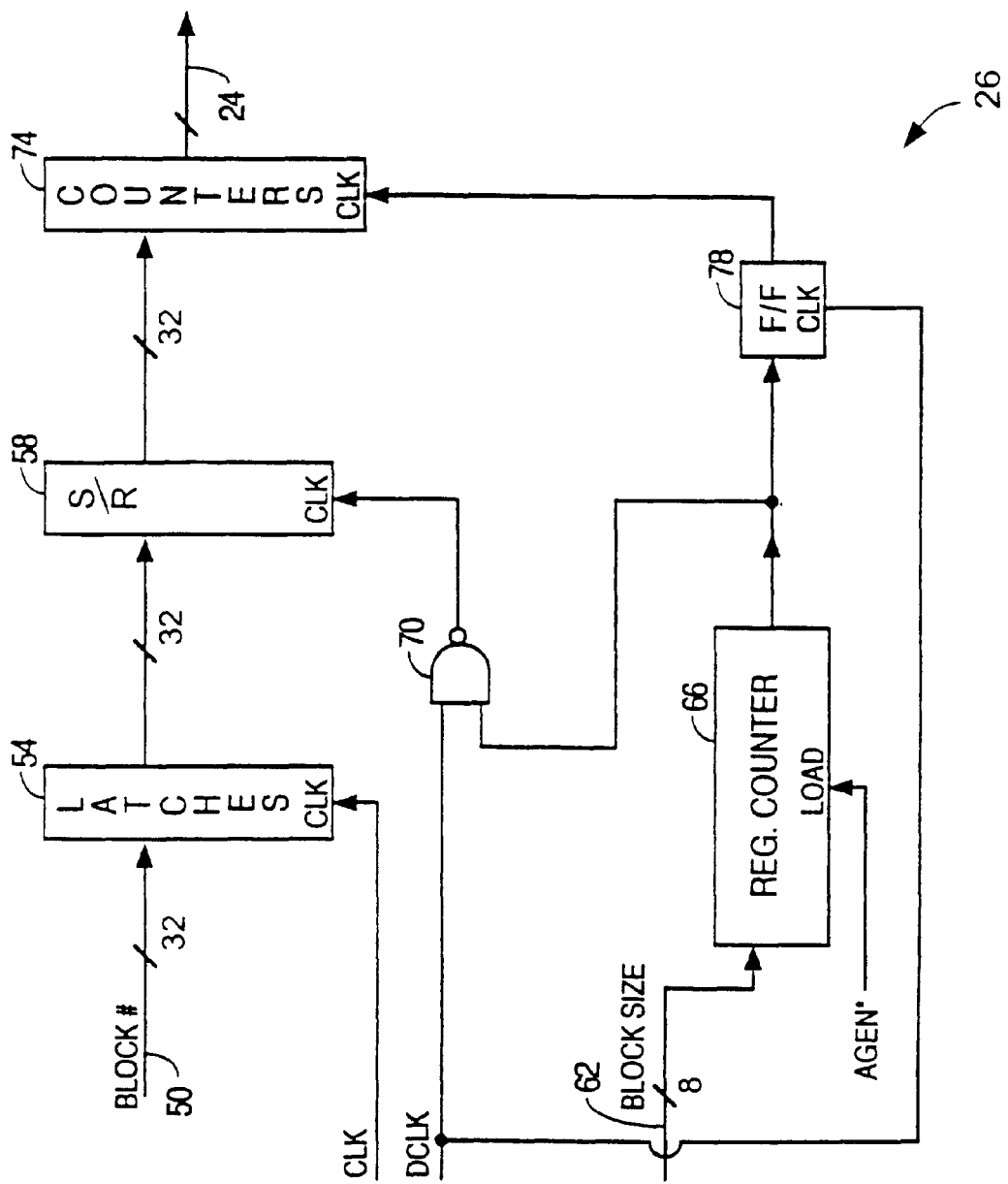
FIG. 3 is a block diagram of an address generator in accordance with the invention.
Figure 4A:
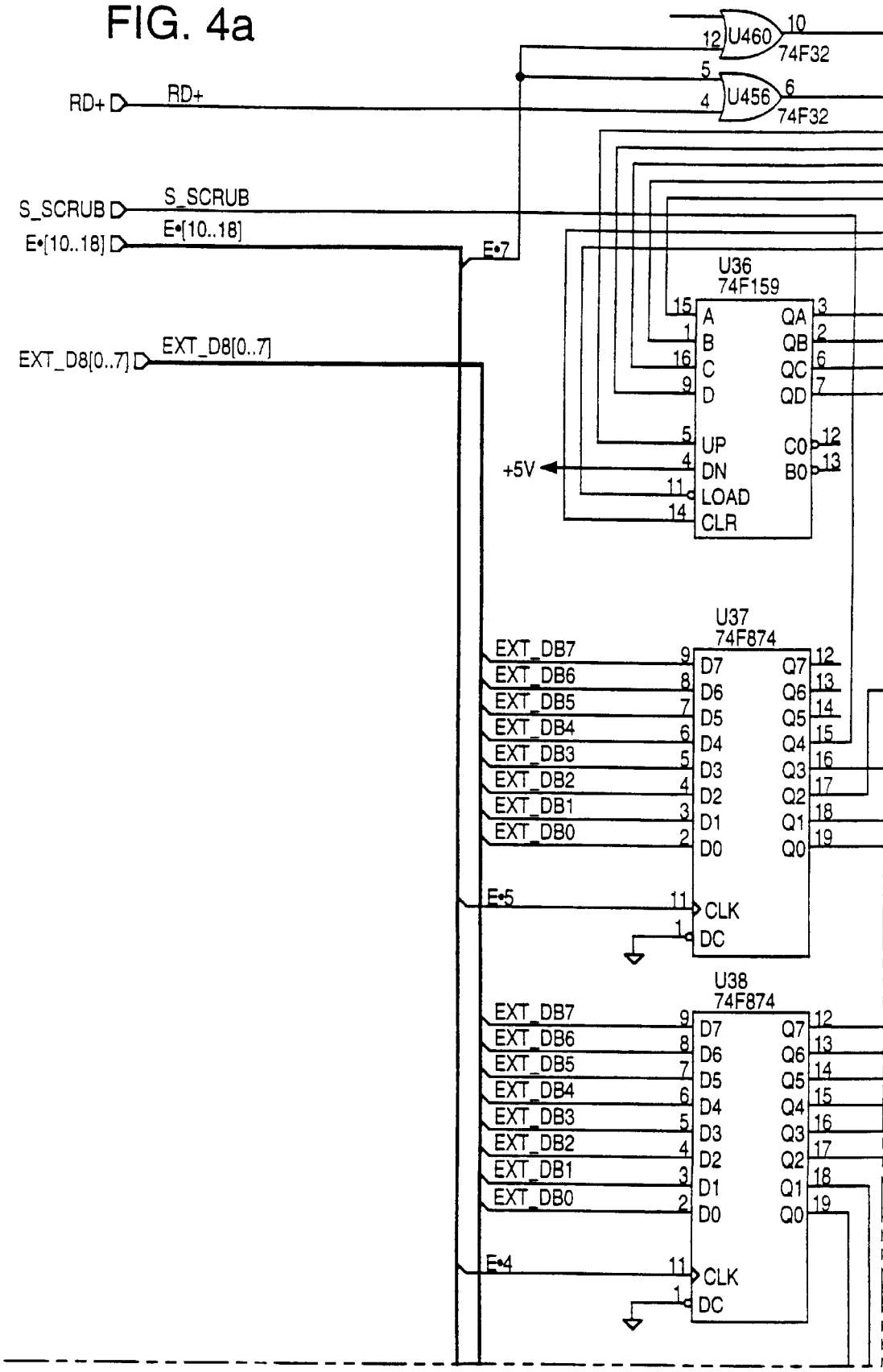
FIG. 4 is a schematic diagram of an address generator in accordance with the present invention.
Figure 4B:
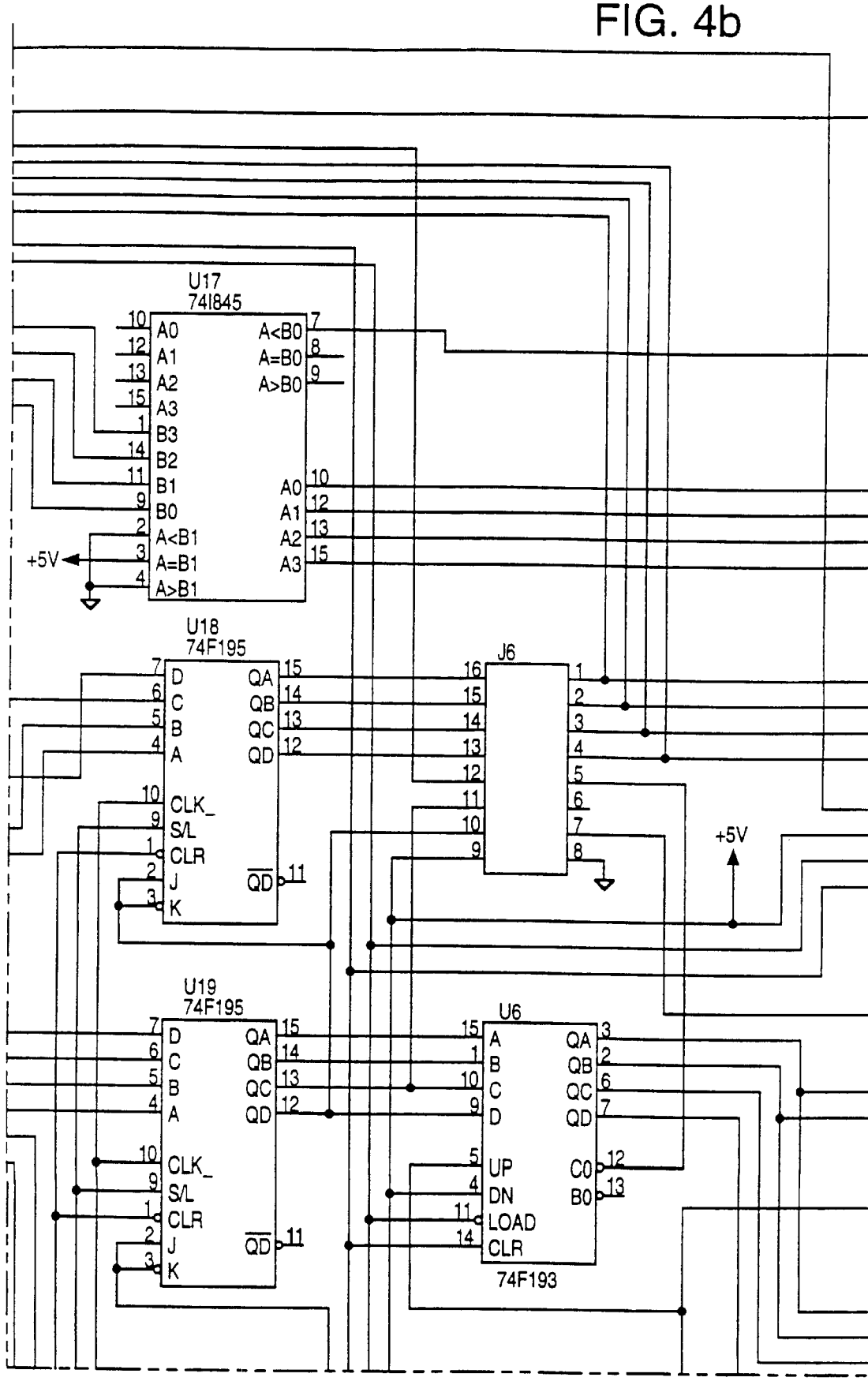
Figure 4C:
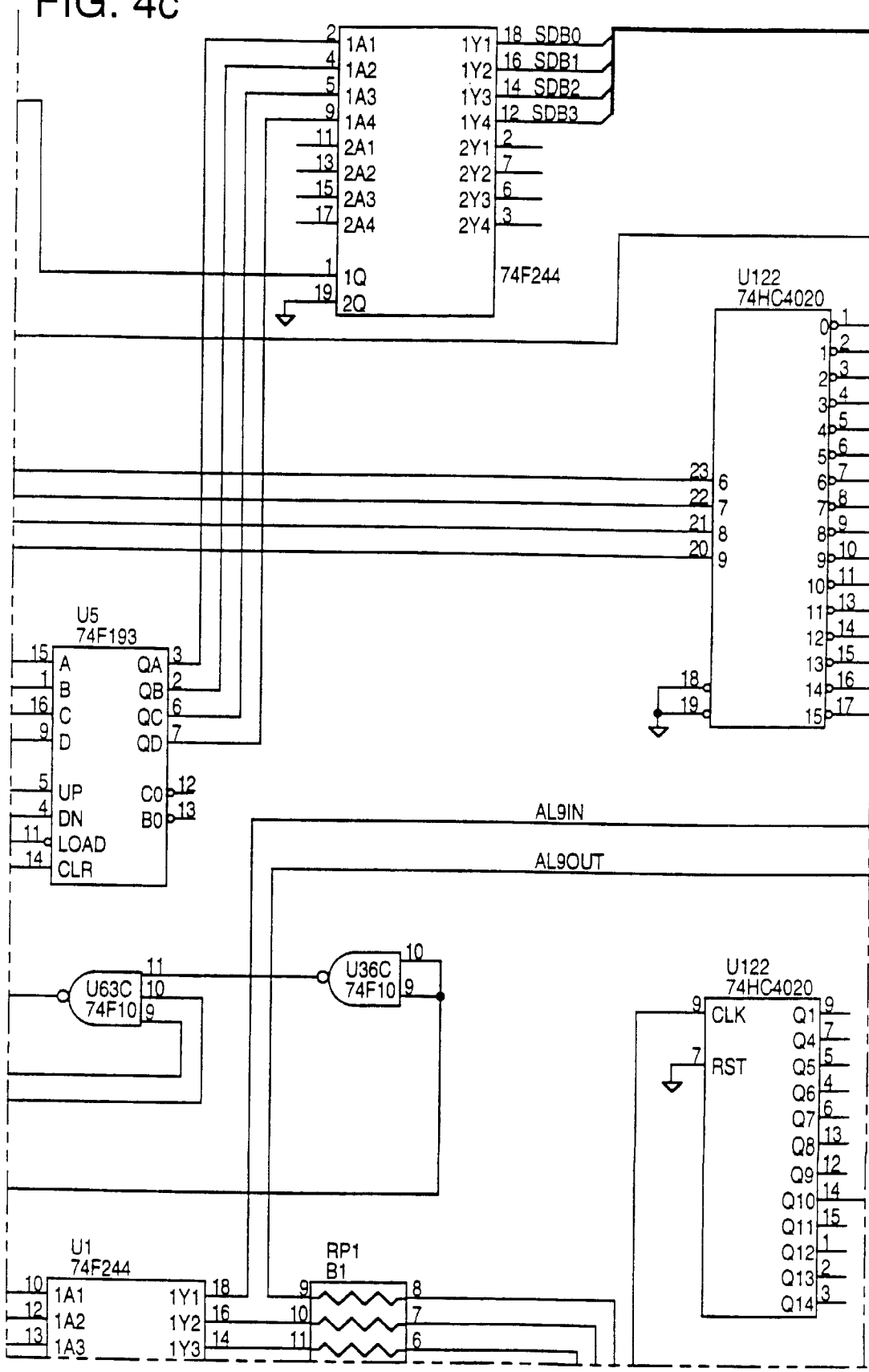
Figure 4D:
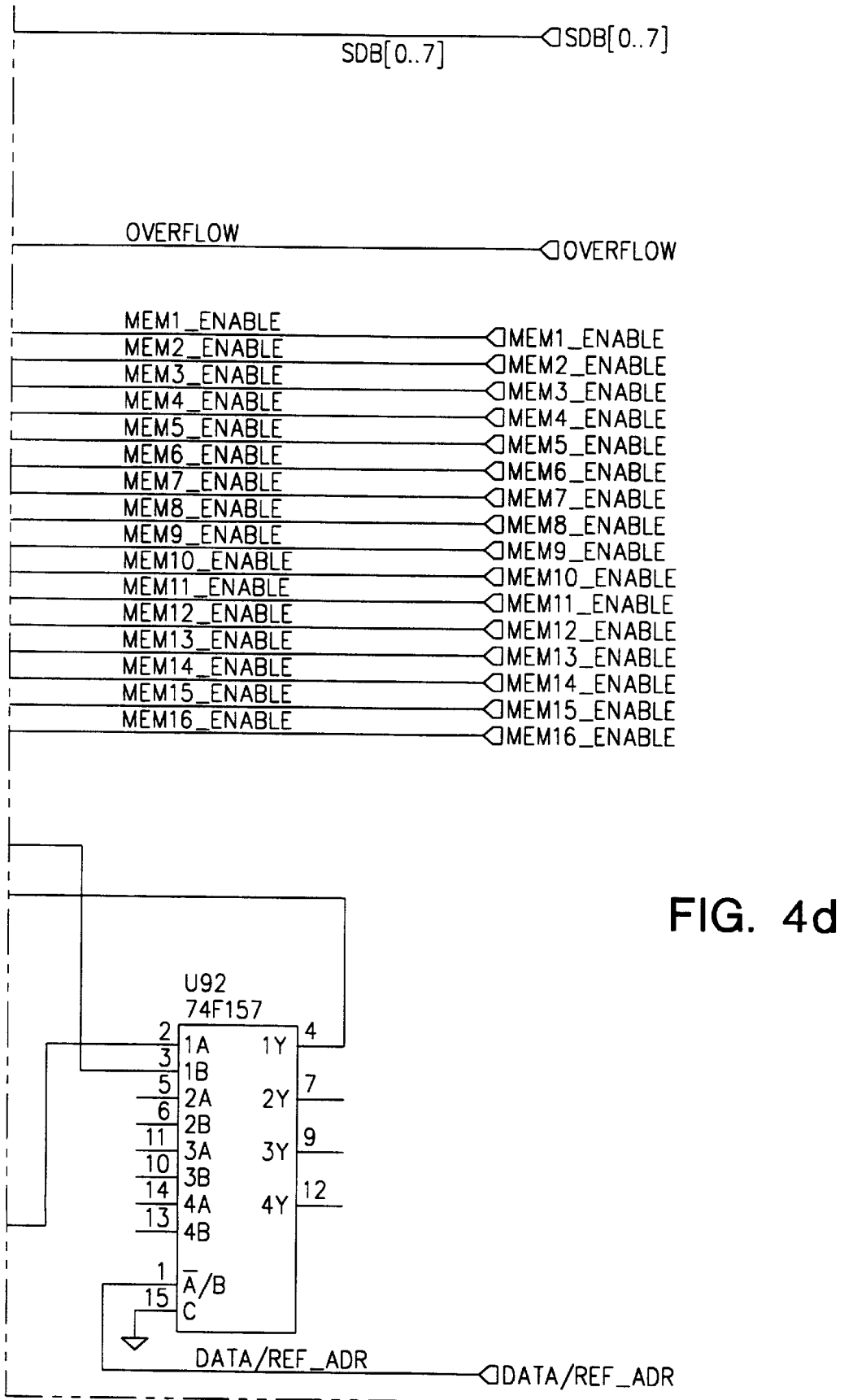
Figure 4E:
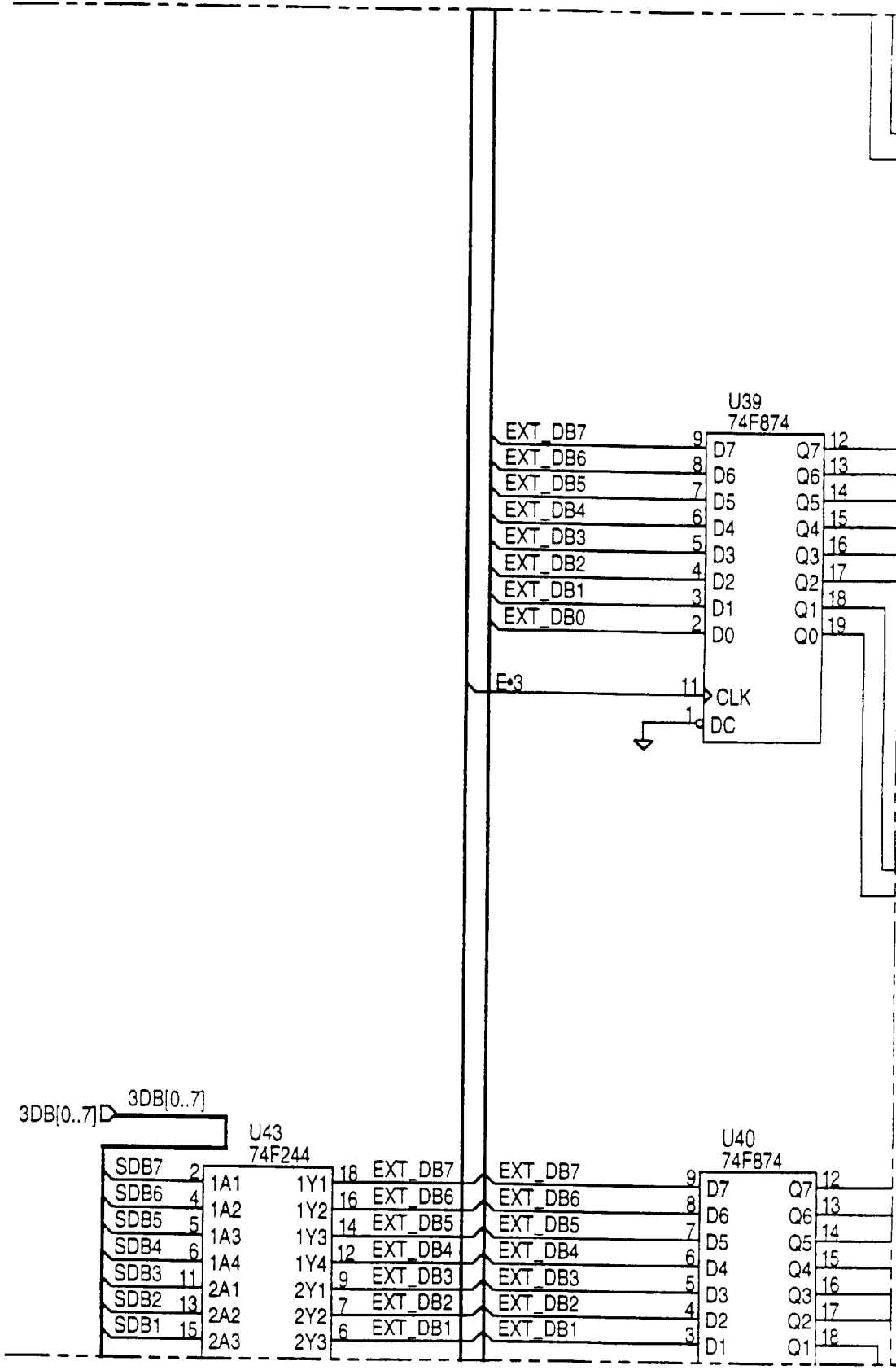
Figure 4F:
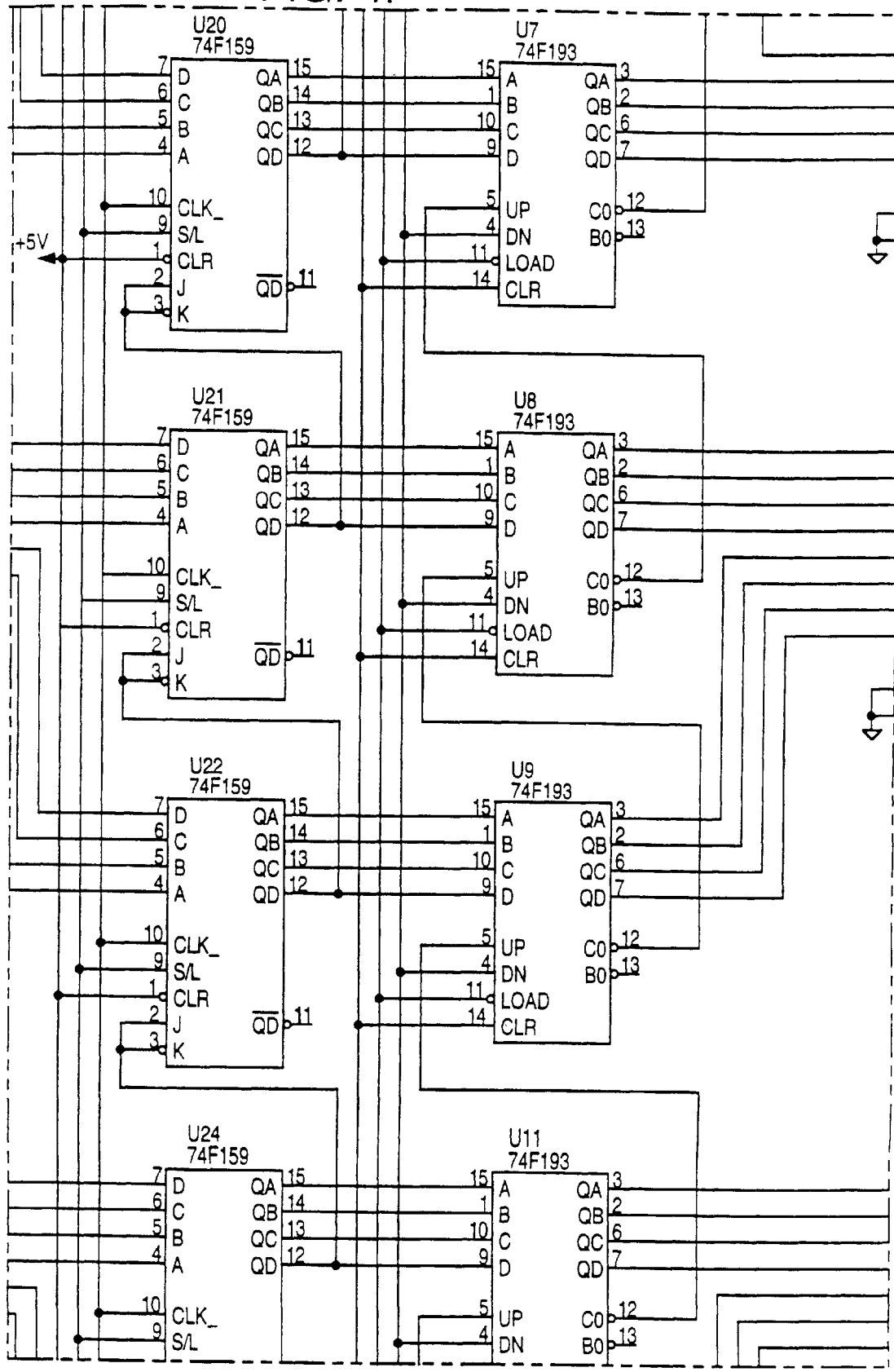
Figure 4G:
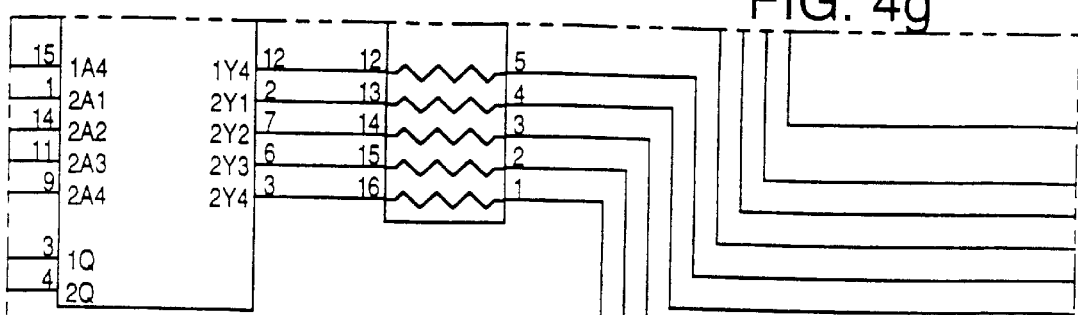
Figure 4G:
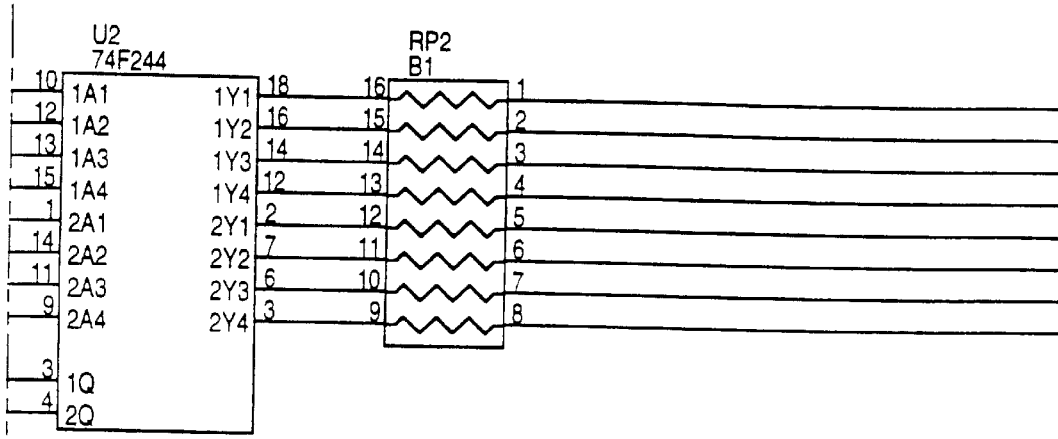
Figure 4G:
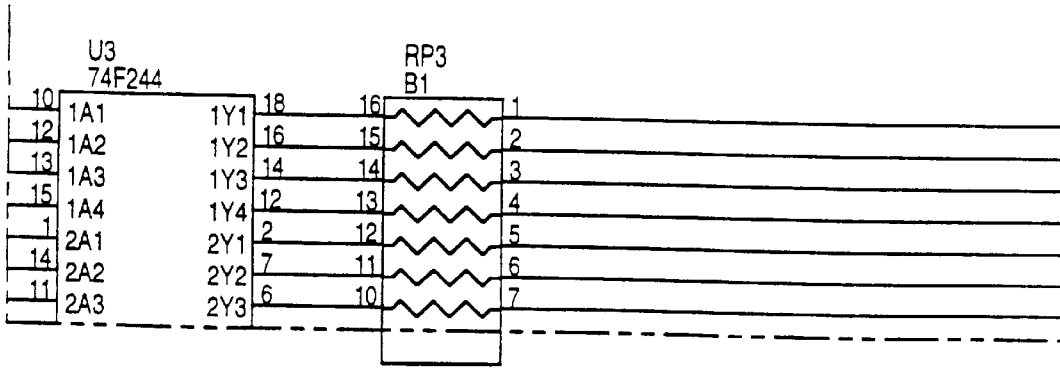
Figure 4H:
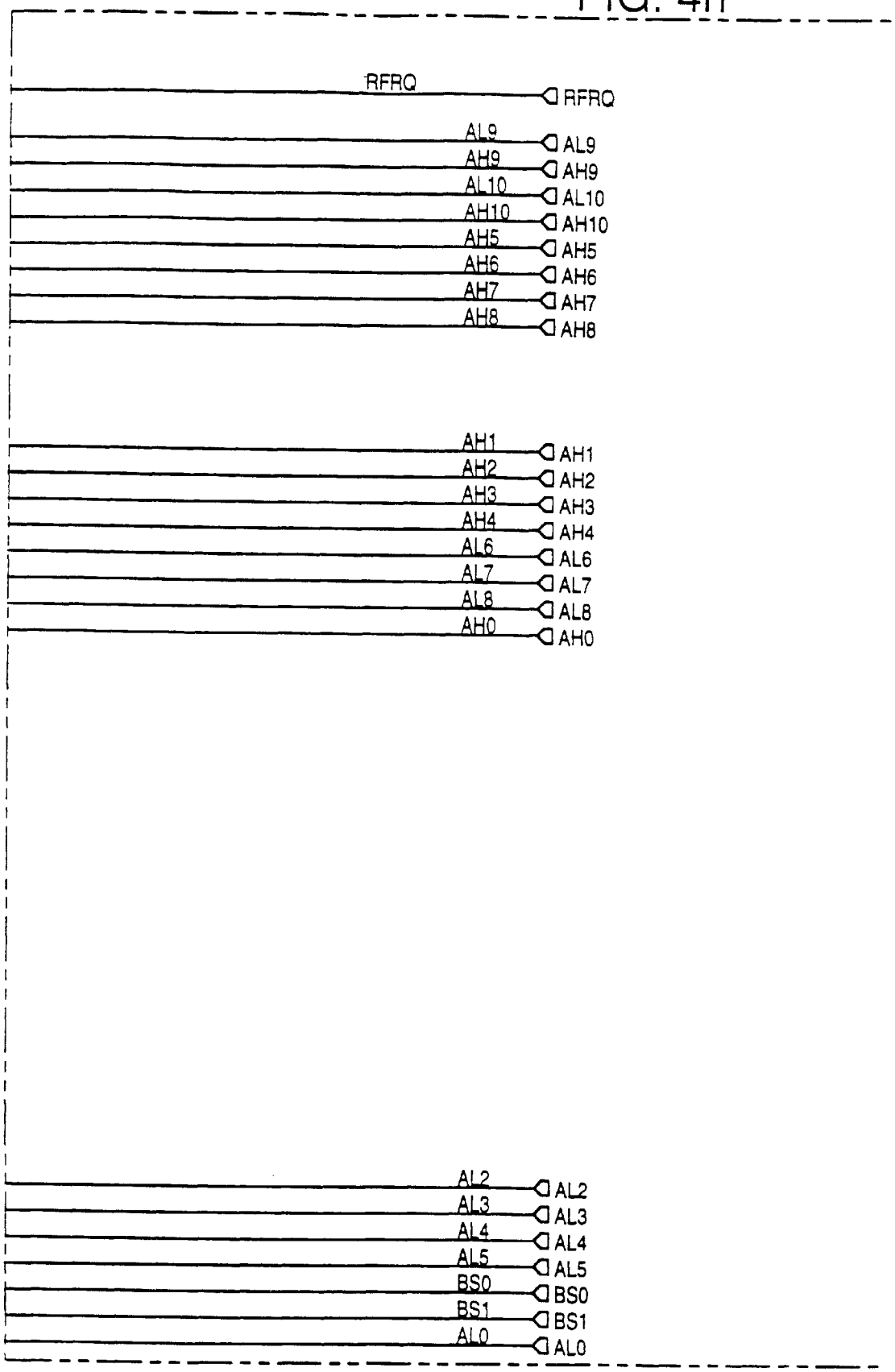
Figure 4I:
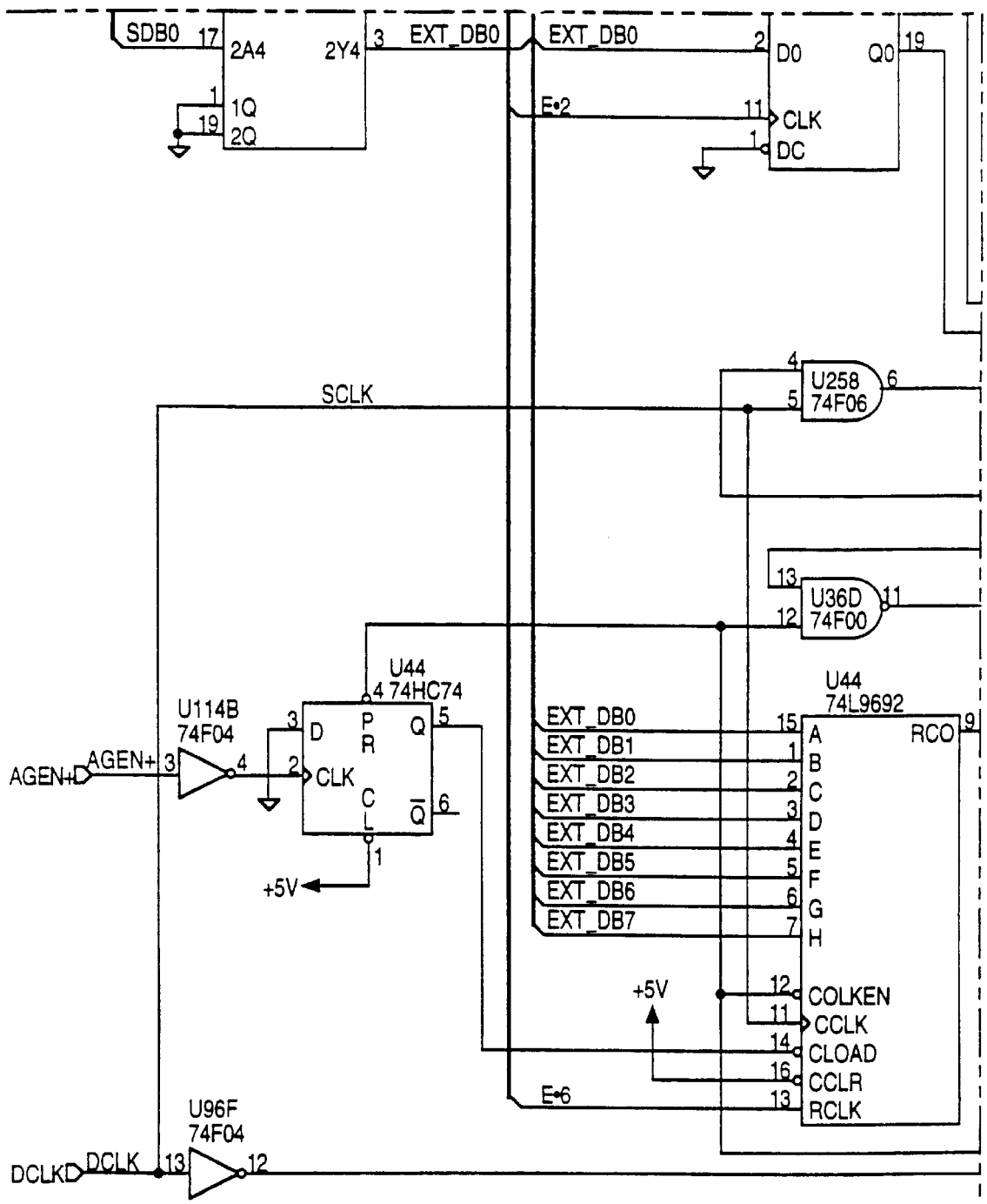
Figure 4J:
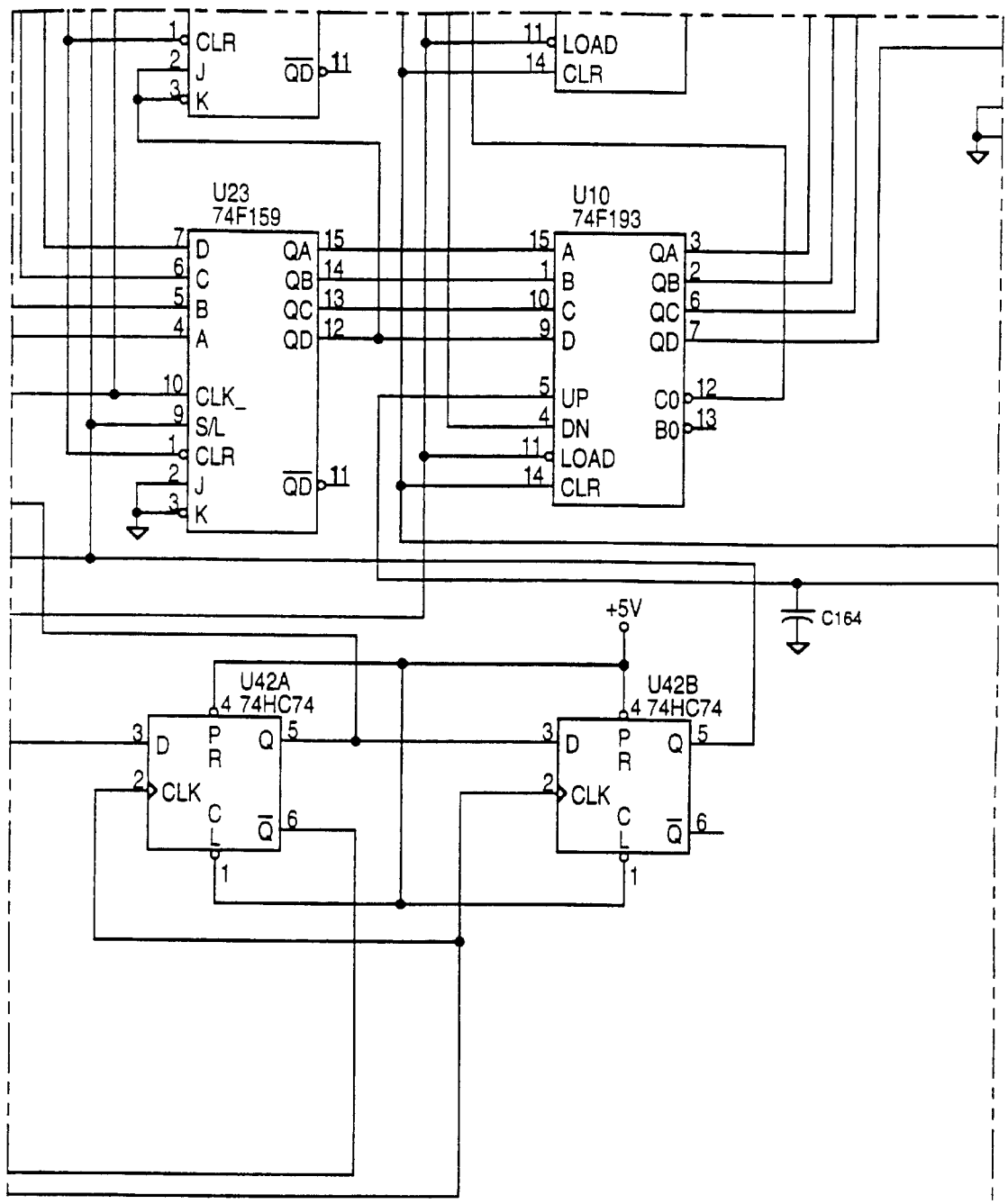
Figure 4K:
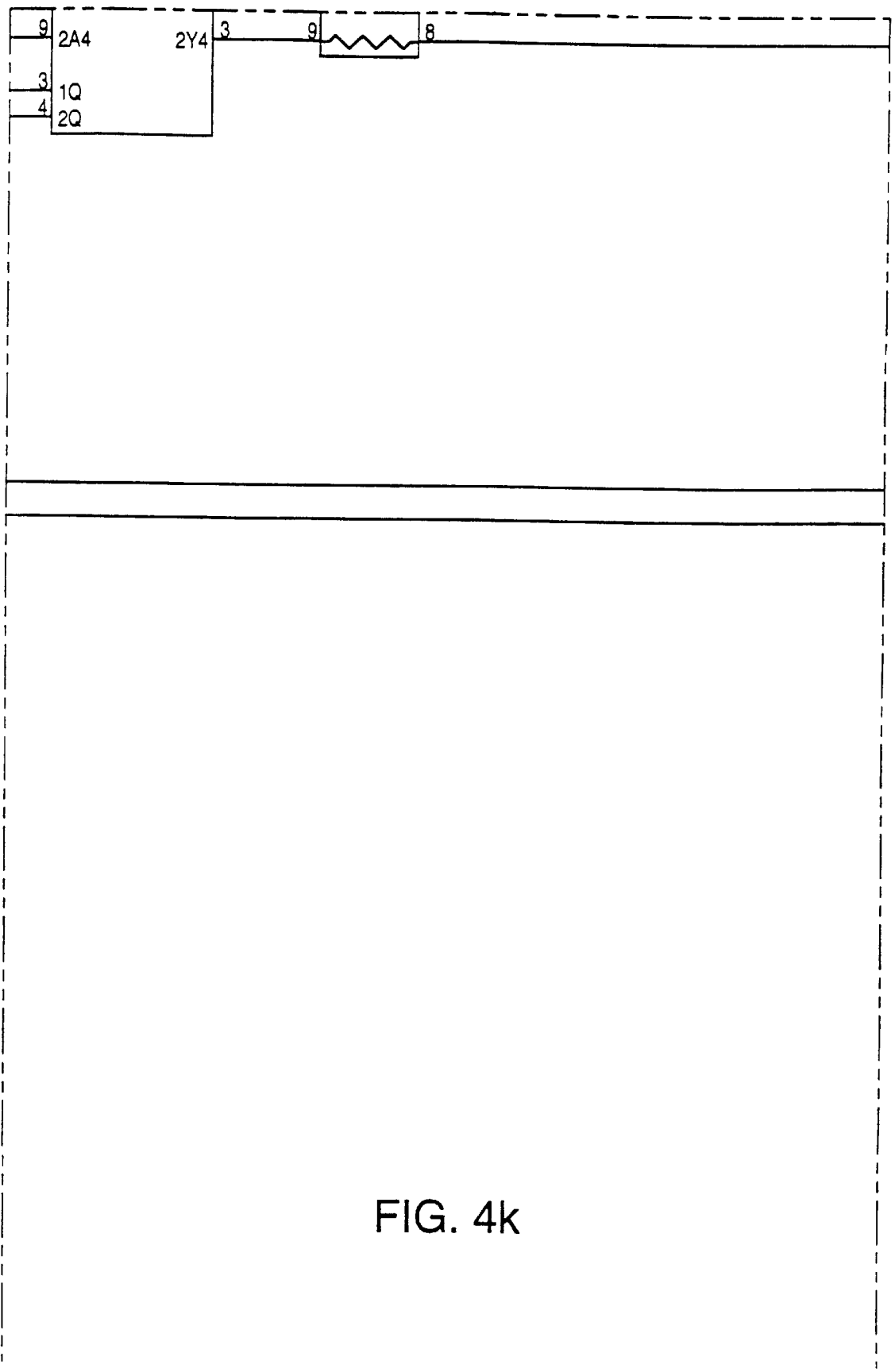
Figure 4I:
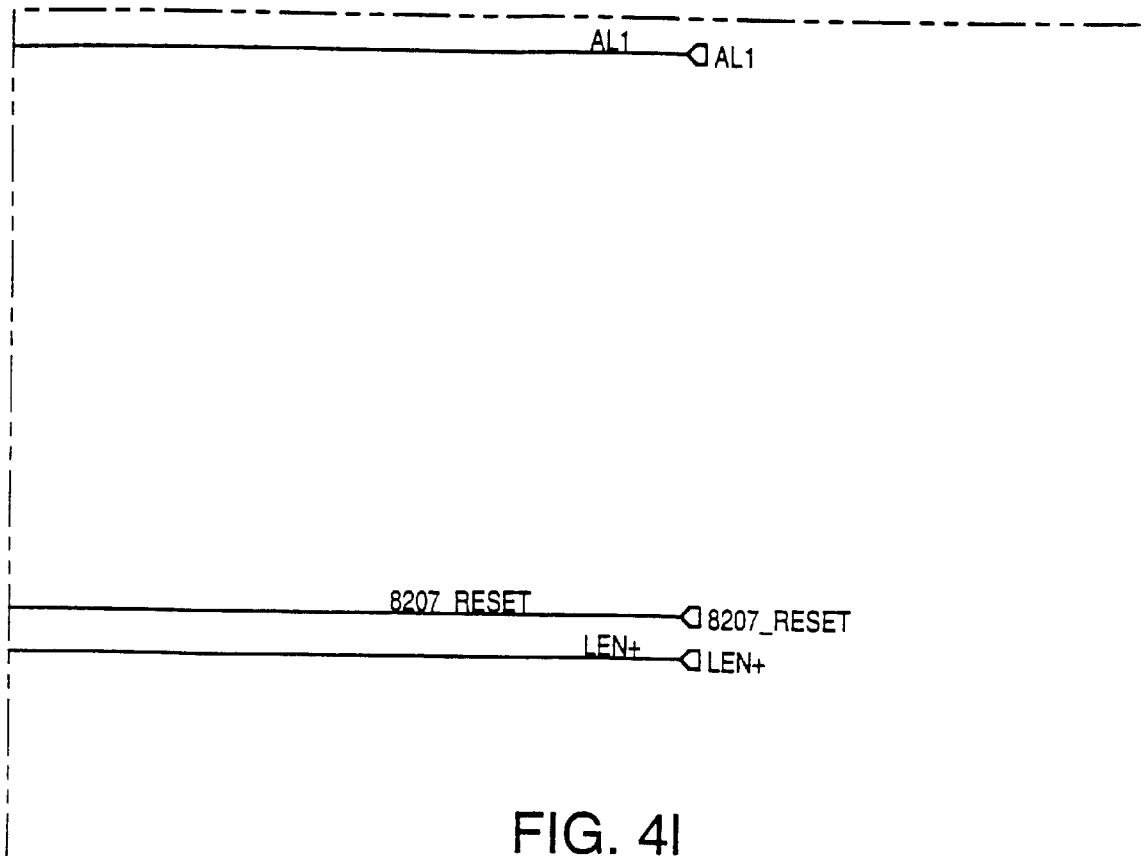

FIG. 3 shows in a block diagram an address generation circuit 26 in accordance with the present invention. The block number (which in this example is a 32 bit value) is received over an input bus 50 from a SCSI port (not shown). In one version bus 50 instead of being a 32 bit bus is an 8 bit bus, data on which is provided sequentially in four 8 bit bytes. The block number is then received into a 32 bit set of latches 54. In response to a clock signal CLK, the latches 54 transmit their data to a shift register 58 having 32 bits.

Figure 1:
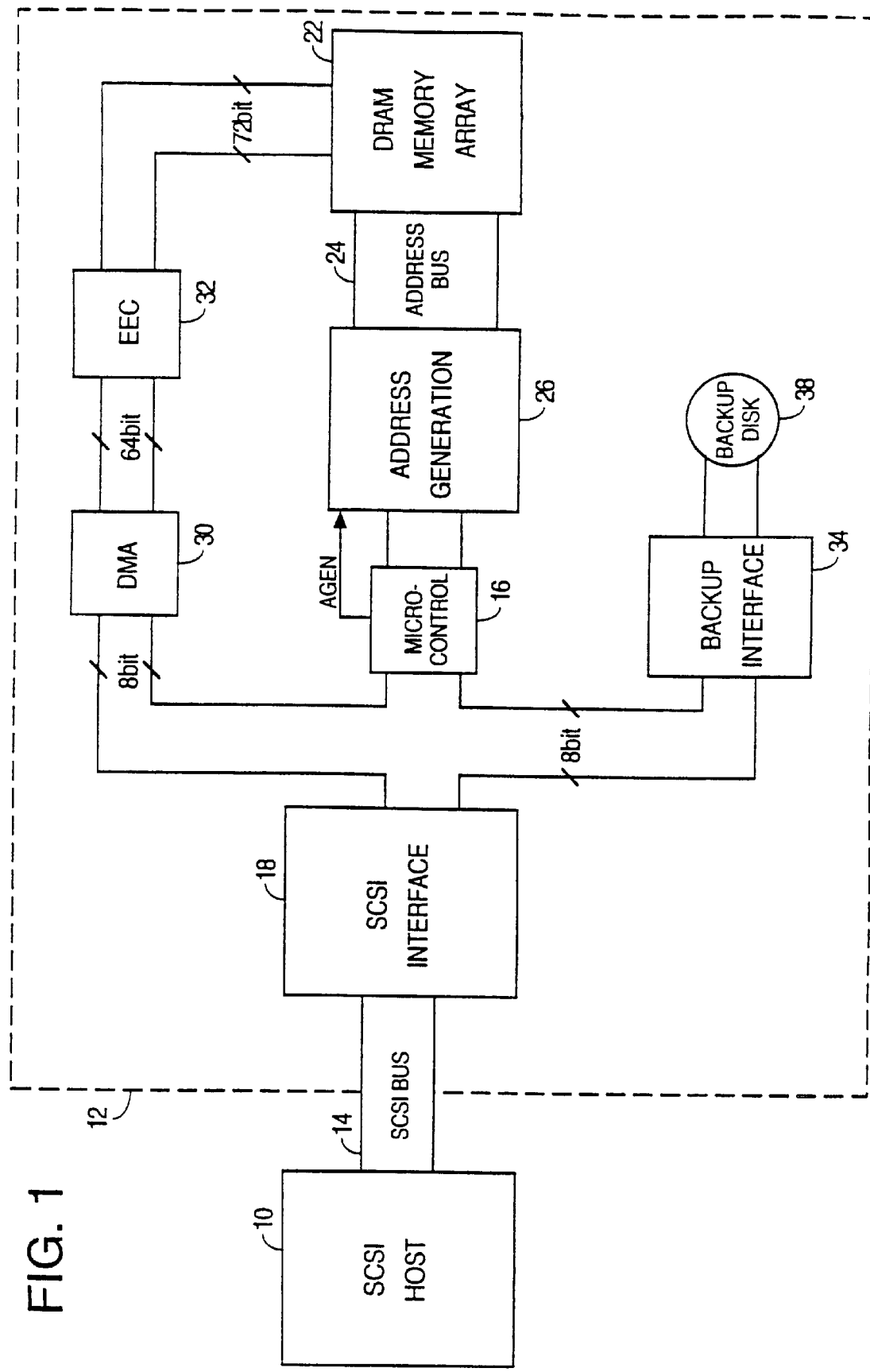
FIG. 1 shows a solid state disk drive system diagram.

Separately, at power up of the address generation circuit 26, a block size value is provided on an 8 bit bus 62 as an input data signal to a registered counter 66 which is an 8 bit device. (In this case the input data signal is an 8 bit multiplication factor, not the actual block size, but derived therefrom as described below.) The registered counter 66 has a "load" terminal which responds to the AGEN* (address generation) signal transmitted from microprocessor 16 of FIG. 1. Upon receipt of the AGEN* signal, the registered counter 66 transmits the block size data value held in its register to a NAND gate 70. The second input to NAND gate 70 is a DCLK signal which is the system MEMORY clock signal. Thus, NAND gate 70 triggers the shift register 58 to engage in shifts a number of times equal to the data value held in the registered counter 66, when signal AGEN* is received. The output of the registered counter 66 also is a clock signal to the 32 bit counter block 74 as shown via flip-flop 78. The values held in shift register 58 are transferred to the counter 74 which then transmits them out as a address on an address bus 24 to the random access memory array 22 of FIG. 1.

FIG. 4 is a detailed schematic of one embodiment of address generator 26. Latches U37, U38, U39 and U40 store the start logical block information received on lines EXT DB [0, . . . , 8] as clocked in by signals on lines E [2, . . . , 5]. (Hence the start logical block number can be up to 32 bits=8 bits×4.) Immediately after, the microprocessor 16 (not shown) negates signal AGEN* input to inverter U114B and then flip-flop U41A to begin the address generation cycle.

The address generation circuit includes also cascaded 4 bit shift registers U18, U19, U20, U21, U22, U23 and U24 which provide the basis for a 28 bit "hardware" (dedicated logic) multiplier circuit. In this schematic the exemplary associated SSD is of 2 gigabytes storage capacity using 4 MB DRAM chips in the memory array. The memory array is 16 modules each containing 128 megabytes, thus 2 gigabytes total. Thus a 28 bit address bus is adequate; however, as DRAM chip density increases, the maximum memory array capacity and hence address bus may grow, e.g. to 32 bits. One address generator is provided for each module.

The address data from the latches U37, . . . ,U40 is loaded into the shift register string U18, . . . ,U24. Then every clock signal supplied to the shift registers U18, . . . ,U24 on their CLK terminals multiplies the address data by two. Thus for large block sizes the shift register-multiplier U18, . . . ,U24 will be clocked proportionally more times than for small block sizes.

The number of shift register clock signals is controlled by registered counter U44, which conventionally consists of an 8 bit register connected to a presettable 8 bit counter. The register is programmed on power up of the SSD with the appropriate multiplication factor on bus EXT DB [0, . . . , 8] for E=5. Signal lines E0 thru E15 are enables for various components in the microprocessor 16 external memory map. The microprocessor 16 can read and/or write these locations across the system address bus (SAB).

When signal AGEN* is set low by the microprocessor 16 of the SSD, the contents of the register part of U44 are loaded into the counter part of U44 because the CLOAD line (connected to the output terminal of flip-flop U41A) has gone low. This causes "ripple carry" to go high on the output terminal RCO of counter U44, and this signal propagates via flip-flop U42A through to the NAND gate U25B. This allows signal DCLK (provided to the second input terminal of NAND gate U25B) through NAND gate 25B, to clock the shift register string U18, . . . ,U24. Each DCLK signal thus multiplies the address data by two.

The clock signal DCLK is e.g. a 16 MHZ clock source; thus each multiplication by two is accomplished in 62.5 nanoseconds.

This multiplication process continues until the internal counter of counter U44 "rolls over" and sets its output signal ripple carry RCO low. This low signal propagates through flip-flop U42A and stops the clock signal to the shift register-multiplier U18, . . . ,U24. Finally this low signal propagates through flip-flop U42B and loads the multiplied address data (i.e., the start address) into the counter string consisting of counters U6, U7, U8, U9, U10 and U11 by clocking each of these counters. The 24 bit output signal of counters U6, . . . ,U11 are provided to the memory array as the starting address for reading or writing this particular logical block. (Only 24 address bits are needed in this particular embodiment.) Output buffers U1, U2, U3 in turn drive resistor blocks RP1, RP2, RP3 which drive address lines AL0, . . . , AL10, AH0, . . . , AH10 and BS0, BS1. Buffers U1, U2, and U3 are required to drive the address lines on as many as 16 memory modules.

Counter U5 drives demultiplexer U15. The outputs of demultiplexer U15 are the module select lines that select any one of the 16 memory modules. OR gates U45A and U45B are part of the address decoding for location E7 of the microprocessor 16 external memory map. Reading location E7 allows the microprocessor 16 to determine which memory module is currently selected. This is accomplished through external buffer U25. Writing to location E7 increments counter U5. This selects the next memory module. Input buffer U43 increases the drive capacity of the CMOS microcontroller 16. Counter U36 and comparator U17 are part of a circuit that controls the switch from one memory module to the next. When a module switch is requested, the microprocessor 16 reads the current module number. If the module is not the last, then microprocessor 16 increments counter U5. If it is the last module, then the command is terminated with an overrange error condition.

Signal lines WR and RD carry the strobe signals from the microprocessor 16 that respectively read and write data to various other components. SCRUB is a signal line that allows the memory array 22 to correct memory errors during the refresh cycles.

Lines DATA/REF ADR (data refresh address) and RFRQ (refresh request) carry signals that enable the address generator to support 4 MB DRAM chips in DRAM memory array 22. Counter U122 counts the signals on line RFRQ and then supplies the count to multiplexer U92, the selection signal for which is supplied on line DATA/REF ADR; when the signal on DATA/REF ADR is low, refreshing is taking place.

The multiplication factor (logical block size value) is adjusted due to the nature of the registered counter U44 used in this circuit. As previously mentioned, the registered counter U44 is an 8 bit device. This implies a count range from 0 to 255 with terminal carry at count 255. Each clock signal of the shift register is a multiply by two, so that one clock=2×, two clocks =4×, three clocks =8× etc. The correct preset value for the register part of register-counter U44 is therefore 255 minus the desired number of clocks.

Naively, it would seem that the desired multiplication factor would be directly the logical block size. Under these conditions, because 512 equals $2^9$, the correct value for the register would be 255−9=246. This is correct if the memory array produces an output that is only one byte wide. However solid state disks can be implemented with a memory array that is considerably wider if single byte resolution is not necessary.

An exemplary solid state disk has a memory bus that is eight bytes wide. Eight equals $2^3$, and therefore the correct block size value factor for this system would be 255−9+3= 249, assuming a 512 byte logical block. This is implemented by a lookup table in the microprocessor 16. The multiplier is the required number of clocks to be presented to the shift register, i.e., the multiplication factor. The circuit stops the multiplication process at rollover, thus the "register value" =255−multiplier. The "register value" is the actual value supplied to registered counter U44.

| Logical Block Size | Multiplier | Register Value |
|---|---|---|
| 256 | 5 | 250 |
| 512 | 6 | 249 |
| 1024 | 7 | 248 |
| 2048 | 8 | 247 |
| 4096 | 9 | 246 |

A computer program resident in microprocessor 16 in the SSD is shown in the microfiche appendix; relevant portions of the program that control address generation are at line 390 and following showing the registered counter 390 being programmed; line 878 and following showing a real routine with AGEN at line 960; and at line 1031 and following showing a write routine with AGEN at line 1100. The program is in the 8051 assembly code language. This computer program is copyrighted; the copyright owner gives permission for facsimile reproduction of material in Patent Office files, but reserves all other copyright rights.

It is to be understood that the present invention, in addition to being compatible with the SCSI interface, is also compatible with other computer bus peripheral interfaces such as IPI or DSSI or similar interfaces that are block specific. More generally, the present invention is applicable to any interface for computer systems which address memory using a logical block number and a block size, and in particular where the block size is of varying (programmable) length.

The above description is illustrative and not limiting; further modifications will be apparent in light of this disclosure and are intended to be covered by the appended claims.

We claim:

1. A method of generating an address for addressing a memory array, comprising:

receiving from a computer bus interface port a block number and a programmable block size value;

providing a multiplier circuit;

changing the block size value in response to a mode command;

multiplying the block number by the block size value in the multiplier circuit; and providing the product of the step of multiplying from the multiplier circuit to the memory array as an address.

\* \* \* \* \*